United States Patent [19]
Thomas et al.

[11] Patent Number: 5,597,279
[45] Date of Patent: Jan. 28, 1997

[54] WHEEL NUT

[75] Inventors: David E. Thomas, Kent; Fred A. Boczar, Maple Hts., both of Ohio; Ronald D. Goforthe, Birmingham, Mich.

[73] Assignee: R B & W Corporation, Cleveland, Ohio

[21] Appl. No.: 398,985

[22] Filed: Mar. 6, 1995

[51] Int. Cl.⁶ .................................................. F16B 37/08
[52] U.S. Cl. ............................................. 411/432; 411/544
[58] Field of Search ........................... 411/11, 432, 155, 411/156, 544, 533

[56] References Cited

U.S. PATENT DOCUMENTS

| | | |
|---|---|---|
| 1,352,918 | 9/1920 | Rohbock . |
| 1,961,470 | 6/1934 | Winchester et al. . |
| 2,169,047 | 8/1939 | Horn . |
| 3,992,974 | 11/1976 | Miki ........................... 85/50 |
| 4,149,446 | 4/1979 | Spengler ..................... 411/11 |
| 4,292,007 | 9/1981 | Wagner ....................... 411/156 |
| 4,431,353 | 9/1984 | Capuano ...................... 411/11 |
| 4,717,299 | 1/1988 | Underwood .................. 411/11 |
| 4,971,498 | 11/1990 | Goforthe .................... 411/134 |
| 5,372,434 | 12/1994 | Roberts ...................... 384/391 |

OTHER PUBLICATIONS

The Mechanical Properties of Metals, by J. G. Tweedale, copyright 1964 pp. 165–166, Use of Hardness Measurement to Determine Properties.

*Primary Examiner*—Steven N. Meyers
*Assistant Examiner*—Gary Estremsky
*Attorney, Agent, or Firm*—Pearne, Gordon, McCoy & Granger

[57] ABSTRACT

A washer for a male or female threaded fastener includes an annular ring portion and a seat portion with a cantilever portion extending therebetween. The washer hardness is selected to exceed the threaded fastener hardness by an amount that enhances the elastic deflection of the washer and reduces the tendency of the fastener to loosen. The selected hardness relationship also reduces the washer diameter dilation during loading and the permanent deformation of the washer diameter.

25 Claims, 2 Drawing Sheets

WHEEL NUT

BACKGROUND OF THE INVENTION AND RELATED ART

The present invention relates to washers for threaded fasteners and to assemblies of washers and threaded fasteners that are particularly useful for mounting wheels to motor vehicles such as trucks.

Numerous special problems are encountered in the wide range of application of male and female threaded fasteners. These problems include the inability of the threaded fastener to deflect under conditions of varying load, loosening during operation, hoop-spreading due to overtightening or overloading and brinelling into the surface of the wheel. In motor vehicle wheel applications, the maintenance of the installed torque under conditions of varying load during use and the loosening of nuts following initial assembly are of particular concern. In case of the latter, loosening is believed to be associated with the tendency of new parts to seat themselves and the thinning of paint layers due to further drying.

The foregoing problems have been solved to a degree by the washer disclosed in U.S. Pat. No. 4,971,498, owned by the assignee of this application; the disclosure of the patent being incorporated herein by reference. The washer of the aforesaid patent provides a cantilever body portion that may be selectively sized to control the degree of deflection resulting upon loading of the washer, but this approach has not been entirely satisfactory or structurally efficient in all cases.

Other examples of solutions to the problem of the inability to deflect under varying load conditions include the following. U.S. Pat. No. 1,352,918 discloses a pair of seat plates which are each provided with an annular flange creating a recessed cavity on its inner face. The seat plates further have a concavely-shaped seat for receiving a convexly-shaped portion of a bolt or nut. U.S. Pat. No. 1,961,470 discloses a frusto-spherical cup-shaped washer which is rotatably connected to a nut at a conically-shaped seat. Each of these solutions suffer from the drawback that they impose columnar loading directly onto the mating surface when a force is imposed which is along the axis of the threaded fastener. As a result, the variation of loading conditions is accommodated by compression, the degree of which depends upon the modulus of the material. Compressive response to variations in loading conditions is not a true deflection response, and usually results in brinelling into the mating surface, as well as fatigue failure and unpredictable loosening of the threaded fastener.

SUMMARY OF THE INVENTION

It has now been discovered that a washer including a cantilever body portion may be provided with a selected hardness to enhance the elastic deflection developed in response to applied loads. The elastic deflection of the cantilever portion of the washer body is enhanced by the judicious selection of the hardness thereof as compared with the hardness of the threaded fastener. In this manner increased elastic deflection properties that tend to prevent loosening of the fastener following initial assembly are achieved and the tendency of the fastener to loosen during subsequent fastening operation or loading is reduced.

The washer hardness properties in accordance with the invention also tend to reduce the permanent washer diameter deformation and the working diameter dilation. This is believed to contribute to the reduced tendency of the fasteners to loosen. The washer hardness has also enabled compliance with the permanent nut height reduction specification for truck applications.

An increased off-torque or break-loose torque as compared with similar washers not having the preferred hardness relationships in accordance with the invention has also been found with the use of washers having hardness properties in accordance with the invention. The off-torque or break-loose torque is believed to increase with increase in the elastic deflection of the washer at least within the hardness ranges found to enhance the elastic deflection.

The washer hardness should be greater than the hardness of the threaded fastener, but not significantly greater, for example about 1 to about 12 R/c points harder (Rockwell hardness points, ASTM F606-90). If the washer hardness is further increased, the washer tends to have unacceptable levels of permanent height deformation and/or elastic deflection. Similarly, if the washer hardness is less than about 1 R/c point greater than the fastener, unacceptable levels of permanent height deformation and/or elastic deflection are again experienced.

The correct combination of washer and fastener hardness may be selected without undue experimentation in accordance with the above guidelines in order to attain the advantages of the invention.

It has been observed that the hardness relationship or proper combination of washer/fastener hardnesses in accordance with the invention also results in more uniform elastic deflection properties. For example, the range of measured elastic deflection values or data scatter is reduced by the use of the preferred hardness relationships in accordance with the invention. This is particularly advantageous since the hardness resulting from through-heat treating is itself characterized by a range or spread of values for a given set of process conditions. Typical through-heat treating is characterized by a resulting range of hardness values or spread of four R/c points. Accordingly, it is particularly surprising and advantageous that the hardness relationships herein also tend to cause the elastic deflection properties to be more repeatable or uniform and the measured values thereof to be in a smaller range than results in the absence of the hardness relationship.

The improved repeatability of the elastic deflection properties in accordance with the invention is also desirable since it enables reliable and economical commercial production of washer constructions having the desired elastic deflection properties. Experience indicates that the elastic deflection should be 0.050" or greater at a 62,100 lb. load (SAE J1965 FEB93, M22×1.5), and such parameter is reliably maintained in accordance with the hardness relationship of the invention. Similarly, the maximum permanent nut height deformation limit of 0.005" set forth in the foregoing specification is also reliably maintained in an acceptable commercial production process.

Accordingly, the present invention provides improvements in the elastic deflection and permanent deformation properties of washers and washer/fastener assemblies not contemplated in prior U.S. Pat. No. 4,971,498, supra, wherein the washer and fastener were of the same hardness and hardened together as an assembly in a heat treating process.

DETAILED DESCRIPTION OF THE DRAWINGS

Figure 1:
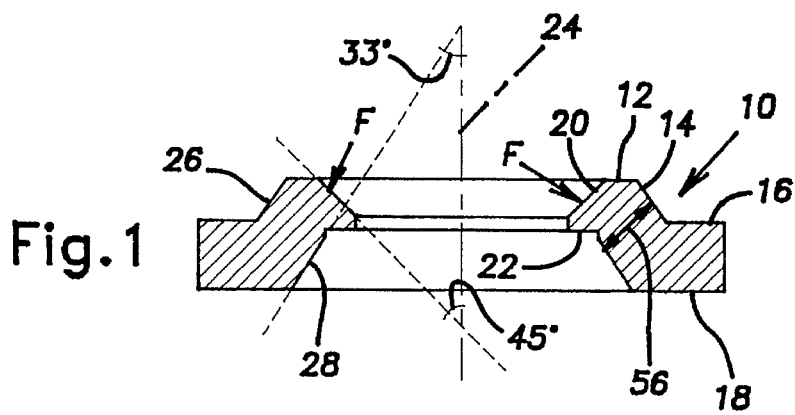
FIG. 1 is a sectional side view of the cantilevered washer in accordance with the present invention.

Referring to FIG. 1, a cantilever washer 10 according to the present invention is shown. The washer 10 includes three integral portions: a conical seat portion 12, a cantilever portion 14 and an annular ring portion 16.

Figure 7:
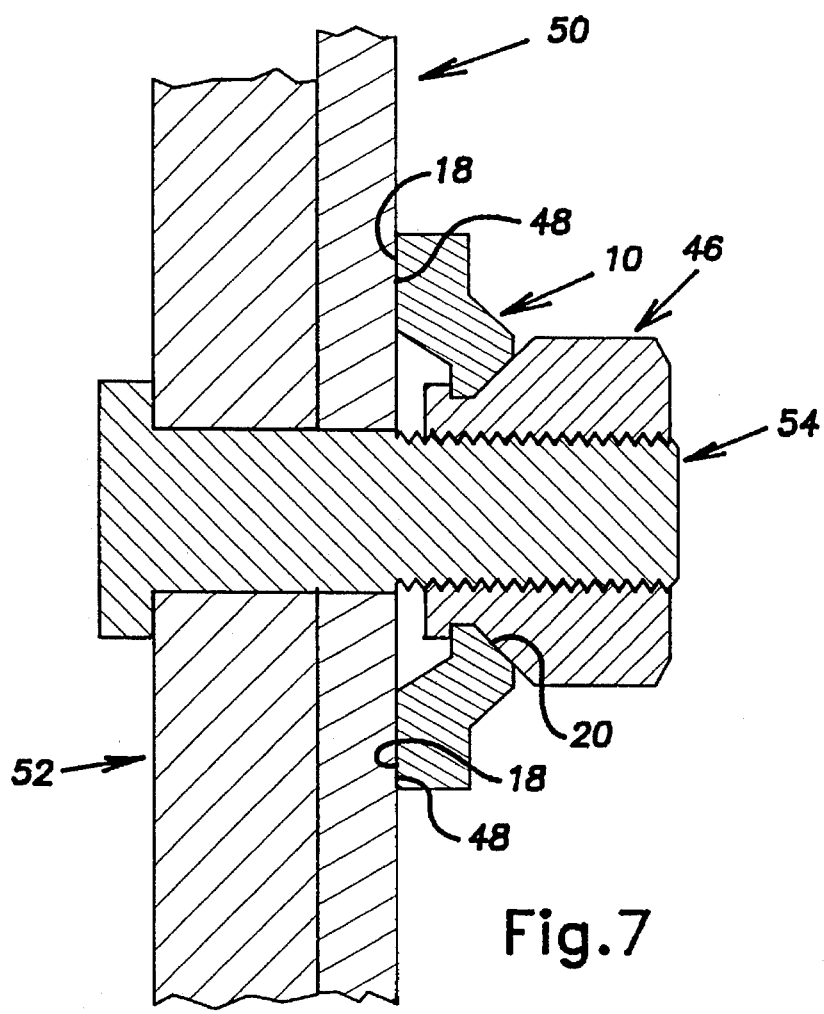
FIG. 7 is a sectional side view of the cantilevered washer according to the present invention in operation in an automotive wheel environment.

The annular ring portion 16 has a flat annular base 18 for engaging a secondary part as shown in FIG. 7. The annular ring portion 16 is preferably rectangular in cross section.

The conical seat portion 12 includes a conically-shaped seat 20. Adjacent the conically-shaped seat 20 is a radially inward projecting shoulder 22. The washer 10 has a center axis 24, and the seat 20 forms an angle of 45° with the center axis 24.

The cantilever portion 14 extends between the conical seat portion 12 and the annular ring portion 16. The cantilever portion 14 offsets the conical seat portion 12 in respect to the annular ring portion 16 along the center axis 24. The axial deflection of the washer in the axial direction is substantially provided by the cantilever displacement in an axial direction without significant movement or deformation of the annular ring portion 16.

Figure 2:
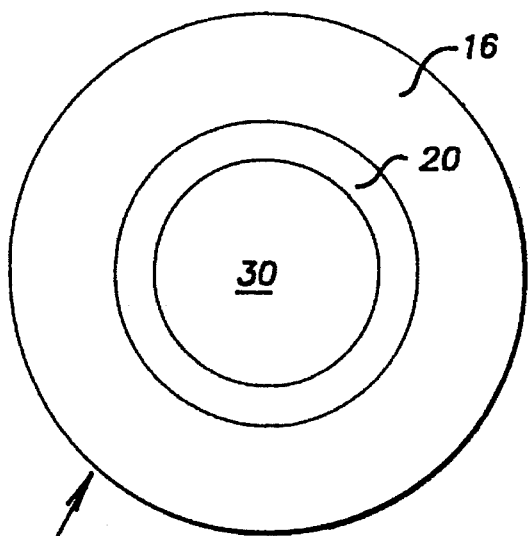
FIG. 2 is a plan view of the cantilevered washer of FIG. 1.

The cantilever portion 14 has a generally frustoconical configuration and includes an outer frustoconical surface 26 and an inner frustoconical surface 28. The inner frustoconical surface 28 extends from the flat annular base 18 to the shoulder 22. As best shown in FIG. 2, the shoulder 22 forms an annular aperture 30 into which a threaded fastener may be located.

The outer frustoconical surface 26 extends at an angle of 35° with respect to the center axis 24. The inner frustoconical surface 28 extends at an angle of 33°±1° with respect to the center axis 24 of the washer 10 in order to assure that the flat base 18 has a sufficient bearing area for annular ring portions 16 specific outside diameter dimension. For different size fasteners, the angle of the surface 28 may range from about 33° to about 45°.

Figure 3:
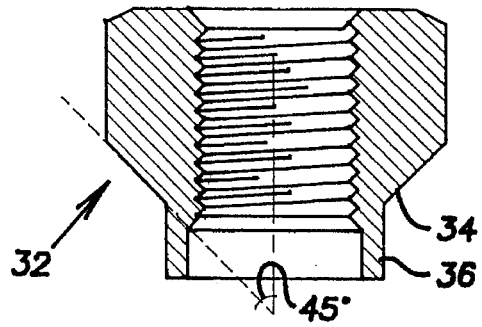
FIG. 3 is a sectional side view of a female threaded fastener according to the present invention.

Referring to FIG. 3, a conventional female threaded fastener 32 comprising a hexagonal nut is shown. The fastener 32 includes a conical portion 34 constructed to mate with the conically-shaped seat portion 20 of the cantilever washer 10. The conical portion 34 extends to an integral annular flange or collar portion 36 that is used to rotatably secure the fastener 32 to the washer 10.

Figure 4:
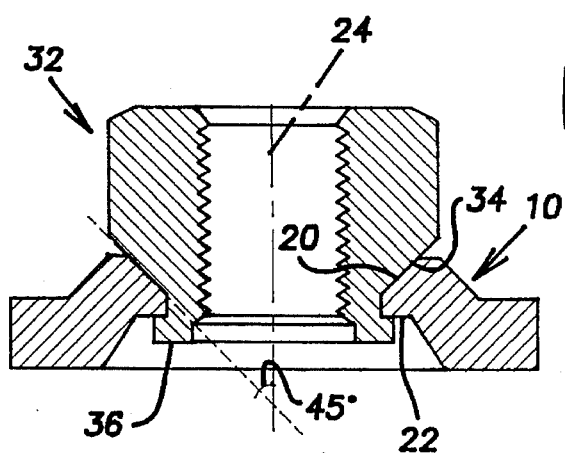
FIG. 4 is a sectional side view of the cantilevered washer of FIG. 1 combined with the female threaded fastener of FIG. 3.
Figure 5:
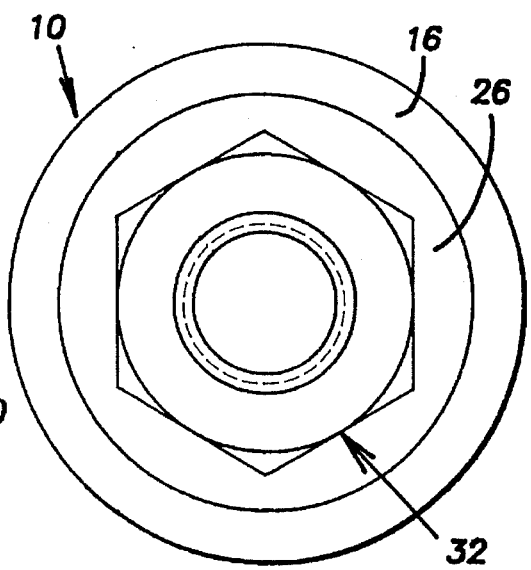
FIG. 5 is a plan view of the cantilevered washer and female threaded fastener combination of FIG. 4.

Referring to FIG. 4, the washer 10 and fastener 32 are secured together by initially seating the fastener conical portion 34 with the conically-shaped seat 20 of the washer, the annular flange 36 extending through the aperture 30 defined by the shoulder 22. The annular flange 36 is then swagged over the shoulder 22. The fastener 32 is thereby rotatably mounted to the washer 10 with the mating surfaces 34 and 20 aligned for load transfer upon application of an axial load along the center axis 24 of the washer 10.

Figure 6:
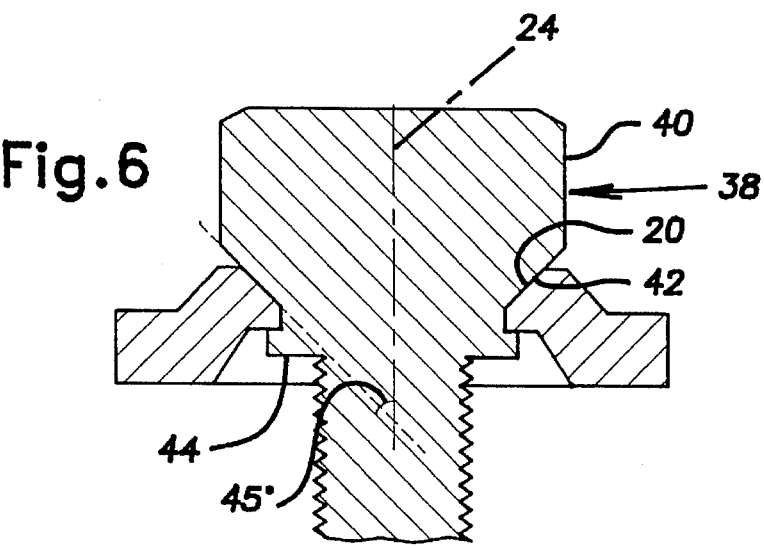
FIG. 6 is a sectional side view of the cantilevered washer of FIG. 1 combined with a male threaded fastener.

A male threaded fastener 38, e.g. a bolt having a hexagonally-shaped head 40, is shown in FIG. 6 in combination with the washer 10. The hexagonally-shaped head 40 includes a conical portion 42 constructed to mate with the conically-shaped seat 20 of the washer 10. The male threaded fastener 38 preferably has an annular flange portion 44 located adjacent the conical portion 42 for the fastening the fastener 38 to the washer 10 while permitting relative rotatability therebetween, in the manner described above with respect to the female threaded fastener 32.

Referring to FIG. 7, the female fastener 32 is replaced by a female stud nut 46 which is mounted to the washer in the above described manner. The washer 10 is shown in fastening or loaded condition with the flat annular base 18 thereof mated with a flat surface 48 of a wheel disk 50 of a conventional wheel for a pneumatic tire, e.g. a truck tire. The wheel disk 50 is structured for conventional operation in a motor vehicle or truck. In this regard, the wheel disk is removably attached to a wheel hub 52 by a plurality of stud bolts 54, only one of which is shown in the figure.

With reference to all of the figures and the motor vehicle application of FIG. 7, the operation of the washer 10 and the threaded fastener or stud nut 46 is described hereinafter. Upon tightening the stud nut 46, the conically-shaped seat 20 of the washer 10 is exposed to both the seating force of the stud nut 46 as well as its hoop stress. Since the resultant force "F" shown in FIG. 1 is along a direction normal to the seat 20, the cantilever washer is uniformly loaded so that the cantilever portion may deflect under the imposed load with the flat annular base 18 at all times remaining flat on the wheel disk surface 48. The variable amounts of deflection of the wheel disk 50 during operation will be accommodated by the washer 10 by deflection of the cantilever portion 14 with little, if any, movement of the washer base 18 along the adjacent surface of the wheel disk 50. Similarly, columnar loading of the annular ring portion 16 is also avoided. In this manner, brinelling of the washer into the wheel disk 50 is reduced.

It is also believed that the deflection of the cantilever portion 14 to accommodate deflection loads from the wheel 50 also serves to lessen the tendency of the threads to loosen when loads are suddenly reduced. The degree of deflection of the washer 10 varies in accordance with the cross-sectional area of the cantilever portion 14, and cold forming of the washer 10 provides uniform grain structure and response to deflection.

As indicated above, the elastic deflection and permanent deformation of the washer 10 are affected by the hardness of the washer including the hardness relationship of the washer to the threaded fastener 32, 38 or 46. Referring to Table 1, deflection, deformation and dilation properties are shown for two-piece flange nuts corresponding in structure with the washer 10 and stud nut 46. The two-piece flange nuts were suitably sized (M22×1.5) for truck applications and provided with various micro phosphate, top and base coatings in a known manner. The washer hardnesses are indicated, and all nuts had a hardness of 30–36 R/c. The washers and nuts were separately hardened using known through-heat treating process techniques to attain the indicated hardnesses. The washers and nuts were cold formed of C-1035 carbon steel.

TABLE 1

| EX. NO. | HARD WASH[1] | HEIGHT PERM DEF[2] | DIA WORK DILATION[3] | DIA PERM DEF[4] | E DEFL 37200[5] | E DEFL 62100[6] |
| --- | --- | --- | --- | --- | --- | --- |
| 1 | 39–40 | 0.004 | 0.0005 | 0 | 0.0427 | 0.0620 |
| 2 | 39–40 | 0.005 | 0.0010 | 0 | 0.0440 | 0.0622 |
| 3 | 39–40 | 0.004 | 0.0030 | 0.0005 | 0.0425 | 0.0605 |
| 4 | 39–40 | 0.003 | 0.0030 | 0.0010 | 0.0390 | 0.0580 |
| 5 | 39–40 | 0.004 | 0.0070 | 0 | 0.0455 | 0.0655 |
| 6 | 39–40 | 0.004 | 0.0030 | 0 | 0.0430 | 0.0615 |
| 7 | 39–40 | 0.004 | 0.0050 | 0 | 0.0392 | 0.0567 |
| 8 | 39–40 | 0.004 | 0.0040 | 0 | 0.0412 | 0.0605 |
| 1CH | 43–44 | 0.002 | 0.0010 | 0 | 0.0455 | 0.0647 |
| 2CH | 43–44 | 0.002 | 0.0050 | 0 | 0.0445 | 0.0637 |
| 3CH | 43–44 | 0.003 | 0.0040 | 0.0010 | 0.0290 | 0.0402 |
| 4CH | 43–44 | 0.006 | 0.0040 | 0 | 0.0372 | 0.0477 |
| 5CH | 43–44 | 0.005 | 0.0030 | 0 | 0.0325 | 0.0492 |
| 1CS | 35–36 | 0.004 | 0.0060 | 0 | 0.0317 | 0.0502 |
| 2CS | 35–36 | 0.004 | 0.0040 | 0.0010 | 0.0250 | 0.0427 |
| 3CS | 35–36 | 0.002 | 0.0060 | 0 | 0.0327 | 0.0512 |
| 4CS | 35–36 | 0.003 | 0.0100 | 0 | 0.0177 | 0.0282 |
| 5CS | 35–36 | 0.006 | 0.0080 | 0.0020 | 0.0297 | 0.0502 |
| 6CS | 35–36 | 0.004 | 0.0080 | 0.0010 | 0.0310 | 0.0487 |

[1] Washer Rockwell hardness, nut hardness 30–36 R/c in all cases, ASTM F606-90
[2] Permanent deformation of nut height after loading in inches, SAE J1965 FEB93
[3] Washer diameter dilation during loading in inches, SAE J1965 FEB93
[4] Washer diameter permanent deformation after loading in inches, SAE J1965 FEB93
[5] Elastic deformation in inches at 37,200 lb. load, SAE J1965 FEB93
[6] Elastic deformation in inches at 62,100 lb. load, SAE J1965 FEB93

As shown in Table 1, the washers in Examples 1–8 in accordance with the invention had a hardness of 39–40 R/c. In practice, through-heat treating processes have a process variation of about 4 R/c points and the examples may be said to be heat treated to a hardness of 39.5±2 R/c in accordance with known heat treating techniques. Preferably, the desired hardness is maintained throughout the interior of the washer.

Comparative Examples 1CH–5CH were of the same structure as Examples 1–8, except for an increased washer hardness, i.e. 43–44 R/c. Comparative Examples 1CS–6CS were also of the same structure, except they had a relatively lower washer hardness of 35–36 R/c. The hardness conditions used in comparative examples 1CS–6CS generally correspond with those in U.S. Pat. No. 4,971,498, discussed above.

Considering Examples 1–8 to have a hardness of 39.5±2 R/c as noted above, the hardness thereof exceeds the hardness of the threaded fastener by about 1 R/c to about 12 R/c points. Preferably, the washer hardness exceeds the threaded fastener hardness by about 4 R/c to about 8 R/c points.

Examples 1–8 achieve elastic deflection values exceeding 0.050" in all cases so as indicate desired deflection characteristics. Based on empirically gathered data and field experience, an elastic deflection of 0.050" or greater provides satisfactory reduction, if not possible elimination, of the tendency of the nut to loosen following initial assembly or installation in a customary manner and during subsequent use. In comparison, comparative examples of both lower and higher hardness values include multiple elastic deflection values below 0.050" and thereby indicate undesirable risks of loosening following initial assembly and during use. It should also be appreciated that the range of deflection values obtained in accordance with the invention is substantially more narrow than that obtained in the comparative examples, e.g. more narrow by a factor of about 3. This denotes better product reproducibility and yields a more narrow range of off-torque or break-loose torque values.

The 0.005" limit for permanent deformation of nut height is maintained in all cases in Examples 1–8, but at least one excessive deformation occurred in each set of comparative examples to indicate unacceptable nut performance due to possible loosening as a result of such deformation. Preferably, the washer diameter permanent deformation should be no greater than about 0.001" since such diametrical enlargement indicates height reduction and a further tendency of loosening. It is also preferred that the working or loaded diameter dilation or increase in diameter not exceed 0.01" in order to reduce undesirable scuffing of the mating surfaces.

Referring to Table 2, the deflection, deformation and dilation properties are shown for a two-piece flange nut marketed by the Metform Company under the designation SECUREX. The tested SECUREX flange nut was of the same size as considered above (M22×1.5), but not of a similar cantilever construction. More particularly, the SECUREX flange nut has the washer and nut components substantially coaxially aligned for contact along mating surfaces disposed at unequal angles with respect to the center axis of the washer. Achievement of effective cantilever support in accordance with the invention contemplates that at least a major portion of the axial projection of the conically-shaped seat 20 is radially off-set or spaced from the annular flat base 18. In preferred embodiments, the axial projection of the seat 20 is substantially off-set or radially spaced from the flat base 18.

TABLE 2

| EX. NO. | HARD WASH[1] | HEIGHT PERM DEF[2] | DIA WORK DILATION[3] | DIA PERM DEF[4] | E DEFL 37200[5] | E DEFL 62100[6] |
| --- | --- | --- | --- | --- | --- | --- |
| 1CM | 38–44 | 0.003 | 0.0010 | 0.0060 | 0.0350 | 0.0500 |
| 2CM | 38–44 | 0.007 | 0.0080 | 0.0005 | 0.0350 | 0.0545 |
| 3CM | 38–44 | 0.007 | 0.0100 | 0.0040 | 0.0347 | 0.0502 |

TABLE 2-continued

| EX. NO. | HARD WASH[1] | HEIGHT PERM DEF[2] | DIA WORK DILATION[3] | DIA PERM DEF[4] | E DEFL 37200[5] | E DEFL 62100[6] |
| --- | --- | --- | --- | --- | --- | --- |
| 4CM | 38–44 | 0.005 | 0.0090 | 0.0040 | 0.0377 | 0.0575 |
| 5CM | 38–44 | 0.009 | 0.0125 | 0.0050 | 0.0365 | 0.0537 |
| 6CM | 38–44 | 0.004 | 0.0095 | 0.0050 | 0.0407 | 0.0607 |
| 7CM | 38–44 | 0.007 | 0.0105 | 0.0050 | 0.0310 | 0.0485 |
| 8CM | 38–44 | 0.002 | 0.0210 | 0.0070 | 0.0392 | 0.0585 |
| 9CM | 38–44 | 0.001 | 0.0020 | 0.0015 | 0.0367 | 0.0547 |
| 10CM | 38–44 | 0.007 | 0.0080 | 0.0025 | 0.0420 | 0.0570 |

[1]Washer Rockwell hardness, nut hardness 28–32 R/c in all cases, ASTM F606-90
[2]Permanent deformation of nut height after loading in inches, SAE J1965 FEB93
[3]Washer diameter dilation during loading in inches, SAE J1965 FEB93
[4]Washer diameter permanent deformation after loading in inches, SAE J1965 FEB93
[5]Elastic deformation in inches at 37,200 lb. load, SAE J1965 FEB93
[6]Elastic deformation in inches at 62,100 lb. load, SAE J1965 FEB93

Referring to Table 2, the elastic deflection is not maintained above the desired 0.050" value in all cases. Further, the washer diameter permanent deformation exceeds the desired 0.001" value achieved in accordance with the invention. Similarly, the washer working diameter dilation exceeds the 0.010" value achieved in accordance with the invention. The washers excessively dilate to a degree that is believed to result in the scuffing of the adjacent surface contacted by the washer. Lastly, the 0.005" limit for permanent deformation of nut height is not maintained. The deficiencies of the SECUREX flange nut indicate the ineffectiveness of heat treating to achieve the advantages of the invention in such non-cantilever constructions.

What is claimed is:

1. A washer and threaded fastener in combination comprising a washer including a seat portion having a center axis and a conically-shaped seat surface concentric with the center axis, an annular ring portion parallel to said seat portion and offset from said seat portion along said center axis, a frustoconically-shaped cantilever portion connecting said seat portion and said annular ring portion, said cantilever portion having an inner frustoconical surface disposed at an angle of less than about 45° relative to said center axis, an outer frustoconical surface and a cross-sectional thickness between said inner and outer frustoconical surfaces, and said washer and said threaded fastener each having a hardness with the washer hardness being greater than the threaded fastener hardness to achieve increased elastic deflection of said washer and threaded fastener and reduced tendency to loosen during fastening operation.

2. The washer of claim 1, wherein said washer has a hardness in the range of from about 37.5 R/c to about 41.5 R/c.

3. The washer of claim 1, wherein said threaded fastener has a hardness in the range of from about 30 R/c to about 36 R/c.

4. The washer of claim 3, wherein said inner frustoconical surface is disposed at an angle of from about 33° to about 45° with respect to said center axis.

5. The washer of claim 1, wherein said washer has a permanent diameter deformation of less than about 0.001" at a tension load of 62,100 lbs.

6. The washer of claim 5, wherein said washer has a hardness in the range of from about 37.5 R/c to about 41.5 R/c.

7. The washer of claim 6, wherein said threaded fastener has a hardness in the range of from about 30 R/c to about 36 R/c.

8. The washer of claim 1, wherein said annular ring portion has a flat annular base adapted to engage a surface of an element to be mounted by said threaded fastener, and said conically-shaped seat surface has an axial projection having at least a major portion thereof radially spaced from said flat annular base of said ring portion.

9. The washer of claim 8, wherein said washer has a hardness in the range of from about 37.5 R/c to about 41.5 R/c, a washer diameter dilation of less than about 0.010" at a tension load of 62,100 lbs. and a permanent diameter deformation of less than about 0.001" at a tension load of 62,100 lbs.

10. The washer of claim 2, wherein said threaded fastener includes a conically-shaped fastener surface adapted to engage said seat surface, said fastener surface and seat surface each being disposed at the same angle to the center axis, said cross-sectional thickness between said inner and outer frustoconical surfaces being sized to provide a preselected degree of deflection of said cantilever portion in response to loading of said washer along said center axis, and said annular ring portion having a flat annular base oriented perpendicularly with respect to said center axis.

11. A washer and threaded fastener combination comprising a washer including a seat portion having a center axis and a conically-shaped seat surface concentric with the center axis, an annular ring portion parallel to said seat portion and offset from said seat portion along said center axis, a frustoconically-shaped cantilever portion connecting said seat portion and said annular ring portion, said cantilever portion having an inner frustoconical surface disposed at an angle of less than about 45° relative to said center axis, an outer frustoconical surface and a cross-sectional thickness between said inner and outer frustoconical surfaces, and a threaded fastener having a conically-shaped fastener surface that is complementarily shaped with respect to said conically-shaped seat surface of said washer and adapted to engage it during fastening operation with uniform transfer of tension load, said washer and said threaded fastener each having a hardness with the washer hardness being greater than the threaded fastener hardness to achieve increased elastic deflection of said washer and threaded fastener and reduced tendency to loosen during fastening operation.

12. The combination of claim 11, wherein said washer has a hardness in the range of from about 37.5 R/c to about 41.5 R/c.

13. The combination of claim 11, wherein said threaded fastener has a hardness in the range of from about 30 R/c to about 36 R/c.

14. The combination of claim 13, wherein said inner frustoconical surface is disposed at an angle of from about 33° to about 45° with respect to said center axis.

15. The combination of claim 11, wherein said washer has a permanent diameter deformation of less than about 0.001" at a tension load of 62,100 lbs.

16. The combination of claim 15, wherein said washer has a hardness in the range of from about 37.5 R/c to about 41.5 R/c.

17. The combination of claim 16, wherein said threaded fastener has a hardness in the range of from about 30 R/c to about 36 R/c.

18. The combination of claim 11, wherein said washer has a hardness in the range of from about 37.5 R/c to about 41.5 R/c, a washer diameter dilation of less than about 0.010" at a tension load of 62,100 lbs. and a permanent diameter deformation of less than about 0.001" at a tension load of 62,100 lbs.

19. The combination of claim 11, wherein said threaded fastener includes retaining means for rotatably securing said washer to said threaded fastener.

20. A wheel system for a motor vehicle, said wheel mounting system including a plurality of wheel mounting devices, each of said wheel mounting devices comprising a wheel hub connected to said motor vehicle, said wheel hub including a plurality of stud bolts projecting therefrom, a motor vehicle wheel including a wheel disk, said wheel disk having a plurality of apertures for aligning with said plurality of stud bolts, said motor vehicle wheel being removably mountable on said wheel hub, a plurality of washers, one of said washers being adapted to be associated with each of said stud bolts, each of said washers comprising a seat portion having a center axis and a conically-shaped seat surface concentric with the center axis, an annular ring portion parallel to said seat portion and offset from said seat portion along said center axis, a frustoconically-shaped cantilever portion connecting said seat portion and said annular ring portion, said cantilever portion having an inner frustoconical surface disposed at an angle of less than about 45° relative to said center axis, an outer frustoconical surface and a cross-sectional thickness between said inner and outer frustoconical surfaces, a plurality of threaded stud nuts, one of said nuts being adapted to be associated with each of said washers for mounting said wheel to said wheel hub, each nut having a conically-shaped fastener surface that is complementarily shaped with respect to said conically-shaped seat surface of said washer and adapted to engage it during fastening operation with uniform transfer of tension load, said washer and said threaded fastener each having a hardness with the washer hardness being greater than the threaded fastener hardness to achieve increased elastic deflection of said washer and threaded fastener and reduced tendency to loosen during fastening operation.

21. The system of claim 20, wherein said washer has a hardness in the range of from about 37.5 R/c to about 41.5 R/c.

22. The system of claim 20, wherein said threaded fastener has a hardness in the range of from about 30 R/c to about 36 R/c.

23. The washer of claim 1, wherein the washer hardness is from about 1 to about 12 R/c points harder than said threaded fastener and the threaded fastener hardness is in the range of from about 30 R/c to about 36 R/c.

24. The combination of claim 11, wherein the washer hardness is from about 1 to about 12 R/c points harder than said threaded fastener and the threaded fastener hardness is in the range of from about 30 R/c to about 36 R/c.

25. The system of claim 20, wherein the washer hardness is from about 1 to about 12 R/c points harder than said threaded fastener and the threaded fastener hardness is in the range of from about 30 R/c to about 36 R/c.

* * * * *